NO PRINTED SPECIFICATION AVAILABLE
1922X
J. Smelzer.
Millstone Exhaust.
Patented May 6, 1813.
Cross Section.
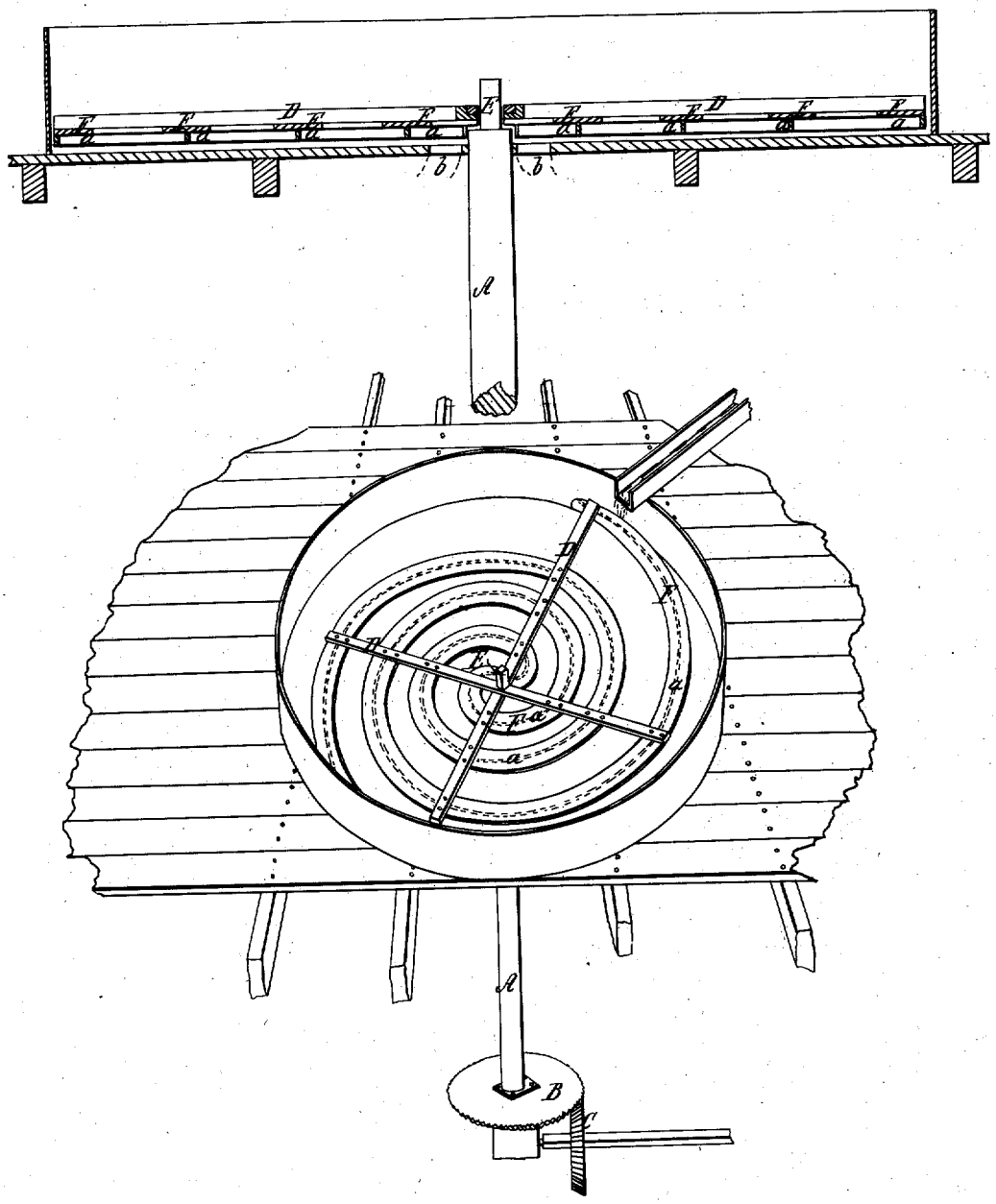

1922X

John Smeltzer
Letters Patent

The Schedule referred to in these Letters Patent and making part of the same containing a description in the words of the said John Smeltzer himself of his Flour worm.

This machine is composed first of an upright shaft or axis with a cog head geared into the running works of the mill. second two cross arms equal in length to the diameter of the worm. these arms are confined together and morticed to receive the upright shaft on which they move up & down easily— Third to the under side of these arms is attached the worm commencing near the centre or upright shaft. and describing a line spiral line to the circumference. The angle which this spiral line forms with the radii may be greater or less as it is required to deliver the flour quicker or slower this too may be regulated by the motion of the machine— Fourth there is attached to the worm a thin hoop descending a small distance below its plane forming a lip or ledge. The machine being thus constructed is put into a rotary motion by means of the cog-head and the flour being conducted within its vortex or circumference the plane of the worm floats on the surface of the flour rising or sinking on its axis at the same time the lip or ledge penetrating the flour by its spiral motion conveys it gradually to the centre where it is discharged on the bolt or by reversing the motion of the machine the flour may be discharged at its circumference Witnesses
John Saul
Israel Wright John Smeltzer Drawing made
[illegible] 1846

Ex'd
[illegible]

300 [illegible]